US006970479B2

(12) United States Patent
Abrahamsson et al.

(10) Patent No.: US 6,970,479 B2
(45) Date of Patent: Nov. 29, 2005

(54) ENCODING AND DECODING OF A DIGITAL SIGNAL

(75) Inventors: Tina Abrahamsson, Stockholm (SE); Soren Vang Andersen, Stockholm (SE); Roar Hagen, Stockholm (SE); W. Bastiaan Kleijn, Stocksund (SE)

(73) Assignee: Global IP Sound AB, Stockholm (SE)

( * ) Notice: Subject to any disclaimer, the term of this patent is extended or adjusted under 35 U.S.C. 154(b) by 770 days.

(21) Appl. No.: 09/853,883

(22) Filed: May 10, 2001

(65) Prior Publication Data

US 2002/0018490 A1 Feb. 14, 2002

(30) Foreign Application Priority Data

May 10, 2000 (SE) .................................... 0001728

(51) Int. Cl.[7] ............................. H04J 3/24; H04J 3/07; G10L 19/04; G10L 19/08

(52) U.S. Cl. ...................... 370/477; 370/474; 370/505; 704/201; 704/219

(58) Field of Search ................................ 370/228–352, 370/386, 401, 463, 471–477; 375/240, 262, 375/242, 245, 283, 341; 704/201–219, 220, 704/222–225; 709/221–224

(56) References Cited

U.S. PATENT DOCUMENTS

| | | | | | |
|---|---|---|---|---|---|
| 4,726,019 | A | * | 2/1988 | Adelmann et al. | 370/474 |
| 5,511,094 | A | * | 4/1996 | Lee et al. | 375/243 |
| 5,528,625 | A | * | 6/1996 | Ayanoglu et al. | 375/222 |
| 5,583,963 | A | * | 12/1996 | Lozach | 704/219 |
| 5,974,374 | A | * | 10/1999 | Wake | 704/215 |
| 6,006,174 | A | * | 12/1999 | Lin et al. | 704/201 |
| 6,009,387 | A | * | 12/1999 | Ramaswamy et al. | 704/222 |
| 6,424,940 | B1 | * | 7/2002 | Agassy et al. | 704/219 |
| 6,463,410 | B1 | * | 10/2002 | Fuchigami et al. | 704/219 |
| 6,664,913 | B1 | * | 12/2003 | Craven et al. | 341/200 |

* cited by examiner

*Primary Examiner*—Man U. Phan
(74) *Attorney, Agent, or Firm*—Townsend and Townsend and Crew LLP

(57) ABSTRACT

The invention relates to methods for encoding/decoding of a digital signal which is transmitted over a packet switched network. Prediction samples are generated at the transmitting and receiving end. The digital signal is lossless encoded at the transmitting end, and lossless decoded at the receiving end, based on the quantizations of generated prediction samples. During encoding, the generated prediction samples are quantized separately from the quantization of the digital samples. The predictions are used in the index domain in the form of quantized indices during encoding/decoding of the digital signal.

30 Claims, 11 Drawing Sheets

ENCODING AND DECODING OF A DIGITAL SIGNAL

CROSS REFERENCES TO RELATED APPLICATIONS

This application is related to U.S. patent application Ser. No. 09/852,939, entitled "TRANSMISSION OVER PACKET SWITCHED NETWORKS", which is incorporated herein by reference.

This application claims foreign priority to Swedish Application Serial No. SE 0001728-5 filed on May 10, 2000.

TECHNICAL FIELD OF THE INVENTION

The present invention relates to encoding of a digital signal and its blocks of digital samples for transmission over a packet switched network. More specifically, the present invention further relates to decoding of a digital signal and its blocks of digital samples received from a packet switched network.

BACKGROUND OF THE INVENTION

Telephony over packet switched networks, such as IP (Internet Protocol) based networks (mainly the Internet or Intranet networks) has become increasingly attractive due to a number of features. These features include such things as relatively low operating costs, easy integration of new services, and one network for voice and data. The speech or audio signal in packet switched systems is converted into a digital signal, i.e. into a bitstream, which is divided in portions of suitable size in order to be transmitted in data packets over the packet switched network from a transmitter end to a receiver end.

Packet switched networks were originally designed for transmission of non-real-time data and voice transmissions over such networks causes some problems. Data packets can be lost during transmission, as they can be deliberately discarded by the network due to congestion problems or transmission errors. In non-real-time applications this is not a problem since a lost packet can be retransmitted. However, retransmission is not a possible solution for real-time applications. A packet that arrives too late to a real-time application cannot be used to reconstruct the corresponding signal since this signal already has been, or should have been, delivered to the receiving speaker. Therefore, a packet that arrives too late is equivalent to a lost packet.

One characteristic of an IP-network is that if a packet is received, the content of the packet is necessarily undamaged. An IP-packet has a header which includes a CRC (Cyclic Redundancy Check) field. The CRC is used to check if the content of the packet is undamaged. If the CRC indicates an error, the packet is discarded. In other words, bit errors do not exist, only packet losses.

The main problem with lost or delayed data packets is the introduction of distortion in the reconstructed speech or audio signal. The distortion results from the fact that signal segments conveyed by lost or delayed data packets cannot be reconstructed. The speech coders in use today were originally designed for circuit switched networks with error free channels or with channels having bit-error characteristics. Therefore, a problem with these speech coders is that they do not handle packet losses well.

Considering what has been described above as well as other particulars of a packet switched network, there are problems connected with how to provide the same quality in telephony over packet switched networks as in ordinary telephony over circuit switched networks. In order to solve these problems, the characteristics of a packet switched network have to be taken into consideration.

In order to overcome the problems associated with lost or delayed data packets during real-time transmissions, it is suitable to introduce diversity for the transmission over the packet switched network. Diversity is a method which increases robustness in transmission by spreading information in time (as in interleaving in mobile telephony) or over some physical entity (as when using multiple receiving antennas). In packet transmission, diversity is introduced on a packet level by finding some way to create diversity between packets in one embodiment. The simplest way of creating diversity in a packet switched network is to transmit the same packet payload twice in two different packets. In this way, a lost or delayed packet will not disturb the transmission of the payload information since another packet with identical payload, most probably, will be received in due time. It is evident that transmission of information in a diversity system will require more bandwidth than transmission of information in a regular system.

Many of the diversity schemes or diversity systems in the prior art have the disadvantage that the transmission of a sound signal does not benefit from the additional bandwidth needed by the transmitted redundant information under normal operating conditions. Thus, for most of the time, when there are no packet losses or delays, the additional bandwidth will merely be used for transmission of overhead information.

Since bandwidth most often is a limited resource, it would be desirable if a transmitted sound signal somehow could benefit from the additional bandwidth required by a diversity system. It would be desirable if the additional bandwidth could be used for improving the quality of the decoded sound signal at the receiving end in some embodiments.

In "Design of Multiple Description Scalar Quantizers", V. A. Vaishampayan, IEEE Transactions on Information Theory, Vol. 39, No. 3, May 1993, the use of multiple descriptions in a diversity system is disclosed. The encoder sends two different descriptions of the same source signal over two different channels, and the decoder reconstructs the source signal based on information received from the channel(s) that are currently working. Thus, the quality of the reconstructed signal will be based on one description if only one channel is working. If both channels work, the reproduced source signal will be based on two descriptions and higher quality will be obtained at the receiving end. In the article, the author addresses the problem of index assignment in order to maximize the benefit of multiple descriptions in a diversity system.

In a system that transmits data over packet switched networks, one or more headers are added to each data packet. These headers contain data fields with information about the destination of the packet, the sender address, the size of the data within the packet, as well as other packet transport related data fields. The size of the headers added to the packets constitutes overhead information that must be taken into account. To keep the packet assembling delay of data packets small, the payload of the data packets have limited size. The payload is the information within a packet which is used by an application. The size of the payload, compared to the size of the actually transmitted data packet with its included overhead information, is an important measure when considering the amount of available bandwidth. A problem with transmitting several relatively small data packets, is that the size of the headers will be substantial in comparison with the size of the information which is useful for the application. In fact, the size of the headers will not seldom be greater than the size of the useful information.

To alleviate bandwidth problems, it is desirable to reduce the bit rate by suitable coding of the information to be transmitted. One scheme frequently used is to code information data using predictions of the data. These predictions are generated based on previous information data of the same information signal. However, due to the phenomenon that packets can be lost during transmission, it is not a good idea to insert dependencies between different packets. If a packet is lost and the reconstruction of a following information segment is dependent on the information contained in the lost packet, then the reconstruction of the following information segment will suffer. It is important that this type of error propagation is avoided. Therefore, the ordinary way of using prediction to reduce the bit rate of a speech or audio signal is not efficient for these kinds of transmission channels, since such prediction would lead to error propagation. Thus, there is a problem in how to provide prediction in a packet switched system when transmitting data packets with voice or audio signal information.

The use of prediction is a common method in speech coding to improve coding efficiency, i.e. for decreasing the bit rate. An example is the predictive coding technique for Differential PCM (DPCM) coders disclosed in "Digital Coding of Waveforms: Principles and Applications to Speech and Video", N. S. Jayant and P. Noll, Prentice Hall, ISBN 0-13-211913-7 01, 1984. The prediction of a signal sample is computed by a predictor based on a previous quantized signal sample, i.e. the prediction is backward adaptive. The computed prediction sample is then subtracted from the original sample which is to be predicted. The result of the subtraction is the error obtained when predicting the signal sample using the predictor. This resulting prediction error is then quantized and transmitted to a receiving end. At the receiver the prediction error is added to a regenerated prediction signal from a predictor corresponding to the predictor at the transmitting end. This combination of the received prediction error with a calculated prediction value will enable a reconstruction of the original signal sample at the receiver end. This kind of coding leads to bit rate savings since redundancy is removed and the prediction error signal has lower power than the original signal, so that less bits are needed for the quantization of the error signal at a given noise level.

As stated above, this kind of encoding/decoding of speech or audio over a packet switched network leads to error propagation if a packet is lost. When a packet is not received, the prediction value calculated in the decoder will be based on samples of the last packet that was received. This will result in a prediction value in the decoder that differs from the corresponding prediction value in the encoder. Thus, the received quantized prediction error will be added to the wrong prediction value in the decoder. Hence, a lost packet will lead to error propagation. If one would consider to reset the prediction state after each transmitted/received packet, there would be no error propagation. However, this would lead to a low quality of the decoded signal. The reason being that if the predictor state is set to zero, the result will be a low quality of the prediction value during encoding and, thus, the generation of a prediction error with more information content. This in turn will result in a low quality of the quantized signal with a high noise level since the quantizer is not adapted to quantize signals with such high information content.

If a diversity system is implemented based on multiple descriptions, the incorporation of prediction will face additional problems which are due to the fact that the sound signal has several representations. If the above described scheme for predictive encoding/decoding is used together with multiple description quantizers, one of two problems will be present. The problem will be dependent on how the predictors are utilized at the transmitting/receiving end.

If each of the multiple description quantizers at the receiving end were to feed independent prediction filters, the prediction value for each description would be independent of the arrival of the other multiple descriptions. However, with this solution the offset of the different encoded representations will be different between different independent predictor outputs. Thereby the regular spacing between representations from the multiple quantizers is lost, and with that the optimized improvement from receiving multiple descriptions is also lost.

Alternatively, all multiple descriptions could be constructed from the same predictor, thereby maintaining the optimized improvement from receiving multiple descriptions. However, if this prediction is from a pre-defined representation, for example, a best representation obtained from a merger of all descriptions, then synchronization of the decoder with the encoder is lost if one (or more) description of the multiple descriptions is not received due to a packet loss when transmitting that description from the encoder at the transmitting end to the decoder at the receiving end.

Thus, as stated above, there is a problem in how to use prediction for reducing the bit rate of a speech or audio signal for transmission over a packet network, since a lost packet with a signal information segment negatively will affect the reconstruction of the following signal information segment.

When using multiple descriptions, the transmission of the sound signal will require more bandwidth than if a single description was used. In such a system, it would be even more interesting to use prediction in order to reduce the required bandwidth. However, as described above, there is a problem in how to implement the predictive encoding/decoding mechanism in such a system, while maintaining the basic gain of multiple description quantization.

BRIEF DESCRIPTION OF THE DRAWINGS

Features and advantages of the invention will become readily apparent from the appended claims and the following detailed description of a number of exemplifying embodiments of the invention when taken in conjunction with the accompanying drawings in which like reference characters are used for like features, and wherein:

DESCRIPTION OF THE SPECIFIC EMBODIMENTS

Figure 1:
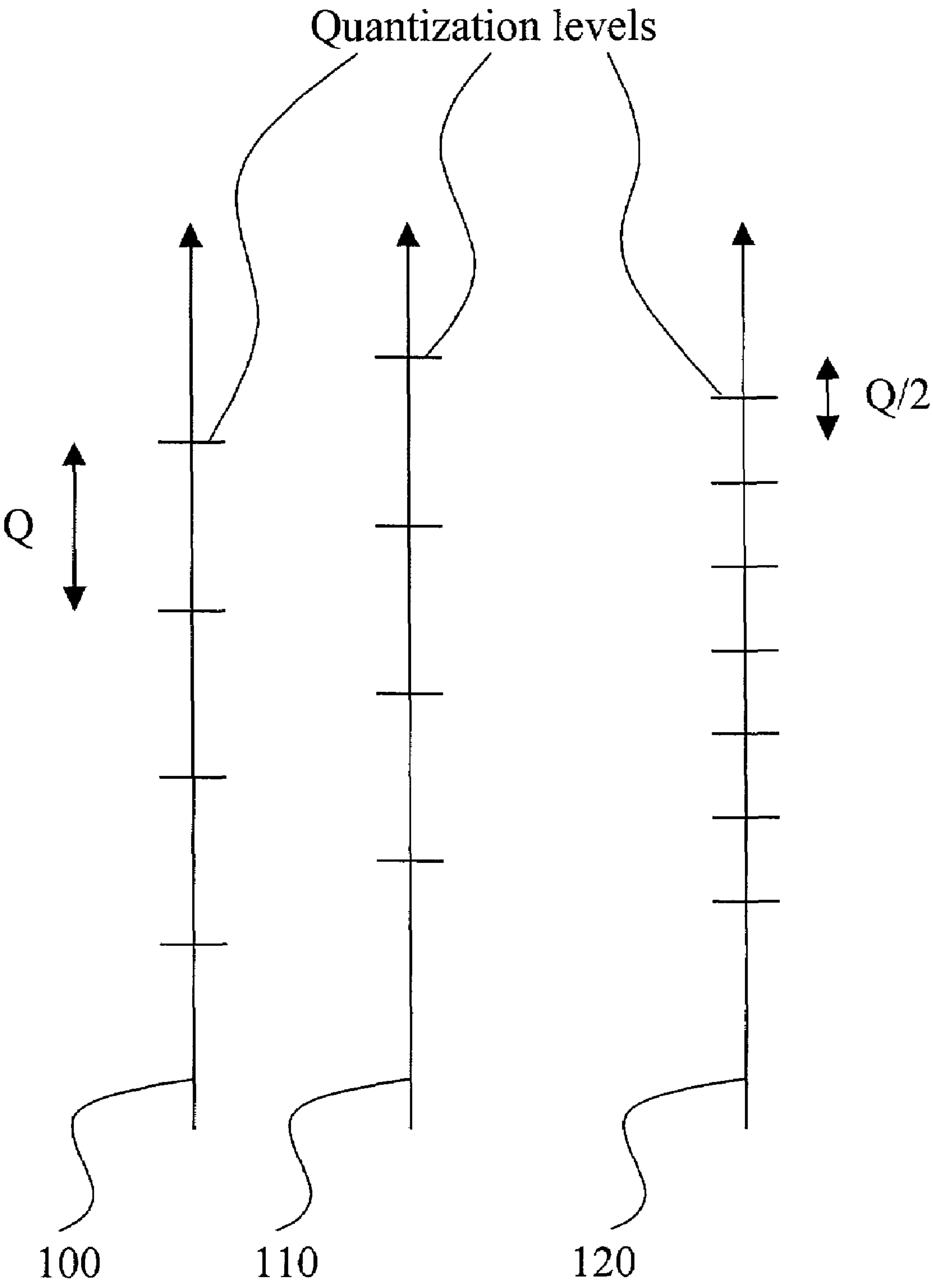
FIG. 1 shows one exemplifying way of realizing multiple descriptions in accordance with state of the art.

The present invention overcomes at least some of the above-mentioned problems of using predictive coding/decoding for reducing the bandwidth required when transmitting a digitized sound signal over a packet switched network.

The present invention provides a way of encoding/decoding digital samples for transmission/reception over a packet switched network. This is performed by lossless encoding the digital samples, and lossless decoding of the corresponding code words, conditioned on generated prediction samples.

Thus, the output from the conditional lossless encoder is a function of two variables: the quantized digital sample and the prediction sample. Correspondingly, the output from the conditional lossless decoder is a function of two variables: the code word and the prediction sample.

The edge effect due to bad prediction values, for example, if a previous packet has been lost, will be alleviated since the lossless encoding still is continuously performed with respect to the quantized digital samples of the digital signal itself. In comparison, if the lossless encoding were performed with respect to the prediction errors only, this would lead to severe edge effects. The reason for this is that a lost packet will imply that the predictor state is reset, or forced to zero, resulting in a great variance of the predictor error. Thus, signals with high information content will be present if a predictor state is forced to zero, or otherwise manipulated, in the beginning of a new block in order to avoid error propagation between different blocks of digital samples. In such a case the prediction error signal would basically be the original digital signal. However, with the solution according to the invention, this is alleviated since the lossless encoding and decoding still will be based on quantized digital signal samples and code words, respectively, conditioned by the prediction value rather than based on prediction errors only.

Thus, using the present invention, a bad prediction value will still enable a good quality of the transmitted signal sample, the trade-off lies in that the bit savings of the lossless encoding/decoding will be low.

Furthermore, the present invention enables that the predictor state, in an embodiment, may be set to zero when generating predictions samples during lossless encoding/decoding of a beginning of a block of digital samples, thus alleviating the effect that lost packets have on error propagation when using predictions in the encoding/decoding process.

During encoding, any quantization of the generated prediction samples are performed separately from the quantization of the digital samples. The predictions may then, in an embodiment, be used in the index domain in the form of quantized indices during encoding/decoding of the digital signal.

One factor in using predictions in this way is that the predictor can be configured to operate in the same way at the receiving end as at the transmitting end, and it will not be necessary to transmit any extra prediction information to the receiving end.

According to some embodiments, predictions based on the quantized digital samples may be generated directly as quantization indices of prediction samples, or as samples which are quantized after its generation using the same set of quantization levels as used for the quantized digital samples, or a completely different set of quantization levels.

In an embodiment, the lossless encoding/decoding is conditioned by generated prediction sample by using these for selecting one out of several look-up tables with which quantized digital samples are losslessly encoded to code words, or code words are losslessly decoded to quantized digital samples.

The quantized prediction, used to condition the lossless encoding/decoding, can be complemented by, for example, a coarsely quantized estimate of the signal or prediction error variance, or other coarsely quantized features extracted from the past of the signal. Thus, a number of features can be extracted from the past of the signal, be coarsely quantized, and then used to condition a lossless encoder or decoder. Hence, a lossless encoder/decoder can be independently optimized and used for each possible combination of indexes from the quantization of the extracted features. Examples of useful features for the encoding of speech signals are: a quantized prediction; the quantizer index from not only one but from several previous samples in the signal; a quantized estimate of signal or prediction-error variance; an estimate for the direction of the waveform; and/or a voiced/unvoiced classification.

Some of the above features can be extracted per sample or per block of samples in the encoder and transmitted as side-information. Waveform direction is an example of such a feature suitable for transmission as side-information, for example, by use of a high-dimensional block code. A voiced/unvoiced classification is another. The side-information results in a product code for the lossless encoding. The encoding of this product code can be made either sequentially or with analysis-by-synthesis.

However, the advantage of the bit rate reduction by lossless encoding/decoding based on predictions is less significant, and the bandwidth still a problem, if a very large overhead in the form of a header is added to the encoded information before transmission of the data packet. This problem will occur if multiple descriptions of the digital signal is used in order to obtain diversity, a problem which however is solved by the present invention.

In one embodiment, the encoder/decoder of the present invention is a multiple description encoder/decoder, i.e. an encoder/decoder which generates/receives at least two different descriptions of a digital signal. Thus, the multiple descriptions thereby provide multiple block descriptions for each block of digital samples.

The invention provides diversity based on multiple descriptions by transmitting/receiving different individual block descriptions of the same block of digital samples in different data packets at different time instances. This so called time diversity provided by the delay between the block descriptions is particularly advantageous when a time localized bottleneck occurs in the packet switched network, since the chance of receiving at least one of the block descriptions of a certain block increases when the different block descriptions are transmitted at different points in time in different packets. In some embodiments, a predefined time interval between the transmissions of two individual block descriptions of the same block of digital samples is introduced.

Advantageously, block descriptions of different descriptions of the digital signal and relating to different blocks of digital samples are grouped together in the same packet. At least two consecutive blocks are represented by individual block descriptions from different descriptions of the digital signal. This is advantageous since it avoids the extra overhead required by the headers of the packets that transmit the different block descriptions for one and the same block of digital samples, while still only one block description of a specific block of digital samples is lost or delayed when a packet is lost or delayed.

Advantageously, lossless encoding/decoding is performed for each different block description individually. This will reduce the bit rate needed for the multiple descriptions that are transmitted. Furthermore, individual predictors of the same type are used for the different descriptions at the transmitting and the receiving end, respectively. This eliminates the problem of lost synchronization between an encoder and a decoder which otherwise can occur if a packet with a block description is lost when using a single predictor for the lossless encoding/decoding at the transmitting/receiving end.

The invention is suitable for a digital signal consisting of a digitized sound signal, in which case a block of digital samples corresponds to a sound segment of the digitized sound signal.

According to the invention the digital signal is optionally an n-bit PCM encoded digitized sound signal. In one embodiment, a 64 kbit/s PCM signal in accordance with the standard G.711. The n-bit PCM encoded signal description is transcoded by a multiple description encoder to at least two descriptions using fewer than n bits for its representation, for example, two (n−1)-bit representations, three (n−1)-bit representations or four (n−2)-bit representations. At the receiver end, a multiple description decoder transcodes the received descriptions back to a single n-bit PCM encoded sound signal. The transcoding corresponds to a translation between a code word of one description and respective code words of at least two different descriptions. By transcoding the PCM coded signal into multiple descriptions, there is no need to first decode and then recode the PCM coded signal to be able to provide multiple descriptions.

Thus, the invention enables the use of predictive coding/decoding when using multiple descriptions for transmitting a digital signal, such as a digitized sound signal, over a packet switched network.

It is to be understood that the term digital signal sample used herein is meant to be interpreted as either the actual sample or as any form of representation of the signal obtained or extracted from one or more of its samples. Also, a prediction sample is meant to be interpreted as either a prediction of an actual digital signal sample or as any form of prediction of a representation obtained or extracted from one or more of the digital signal samples. Finally, a quantization level of a digital sample is either the index or the value of a quantized digital sample.

In FIG. 1, one exemplifying way of realizing multiple descriptions of a source signal, such as a sound signal, is illustrated. This approach is known in the art and is one example of multiple descriptions that can be used by the present invention. However, other suitable ways of implementing multiple descriptions may equally well be used together with the present invention. In FIG. 1, the quantization levels of two different descriptions 100, 110 from two corresponding quantizers are shown. As illustrated, both descriptions have the same quantization step size Q, but description 110 has quantization levels that are shifted with half of the quantization step size Q with respect to the quantization levels of description 100. From these two descriptions 100 and 110, a combination leads to a combined description 120 with finer quantization step size Q/2. Using the two coarse quantizers, a bit rate of 2R is required to match the performance of a single fine quantizer with bit rate R+1. For example, if each description 100 and 110 has 4 quantization levels, each will require 2 bits to code these levels, i.e. a total of 4 bits. If a finer quantizer would be used for the combined description 120, the 7 quantization levels would require 3 bits when coded. For high R, this will constitute a significant increase of the bit rate when using two coarse quantizers for providing multiple descriptions instead of one finer quantizer providing a single description.

Figure 2:
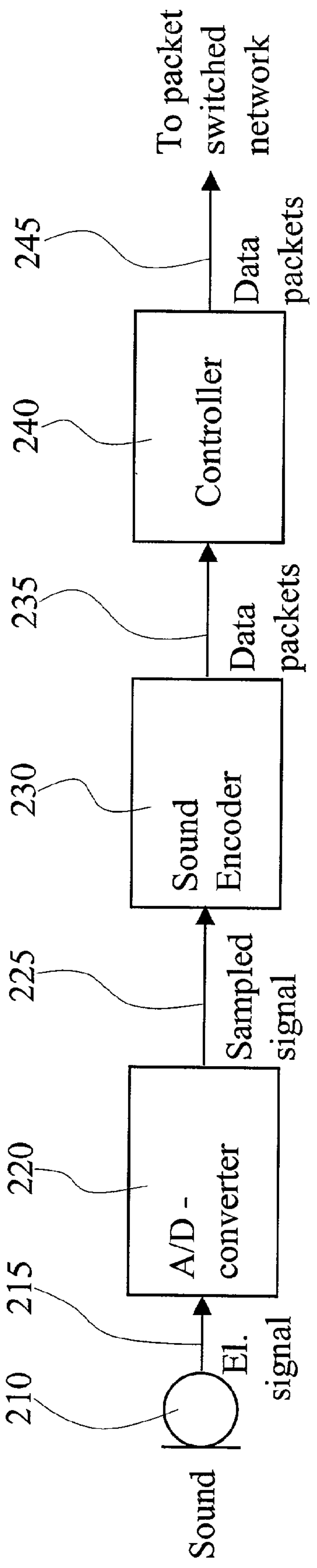
FIG. 2 shows an overview of the transmitting part of a system for transmission of sound over a packet switched network.

In FIG. 2 a block diagram of the transmitting part of a system for transmission of sound over a packet switched network is shown. The sound is picked up by a microphone 210 to produce an analog electric signal 215, which is sampled and quantized into digital format by an A/D converter 220. The sampling rate of the sound signal is dependent on the source of the sound signal and the desired quality. Typically, the sampling rate is 8 or 16 kHz for speech signals, and up to 48 kHz for audio signals. The quality of the digital signal is also affected by the accuracy of the quantizer of the A/D converter. For speech signals the accuracy is usually between 8 and 16 bits per sample. In a typical system, the transmitting end includes a Sound Encoder 230 in order to compress the sampled digital signal further. According to the present invention, an additional purpose of the Sound Encoder 230 is to modify the representation of the sound signal before transmission, with the intent to increase the robustness against packet losses and delays in the packet switched network. The sampled signal 225 is input to the Sound Encoder 230 which encodes the sampled signal and packetizes the obtained encoded signal into data packets. The data packets 235 are then transferred to a Controller 240 which adds sequencing and destination address information to the data packets, in order to make the packets suitable for transmission over a packet switched network. The data packets 245 are then transmitted over the packet switched network to a receiver end.

Figure 3:
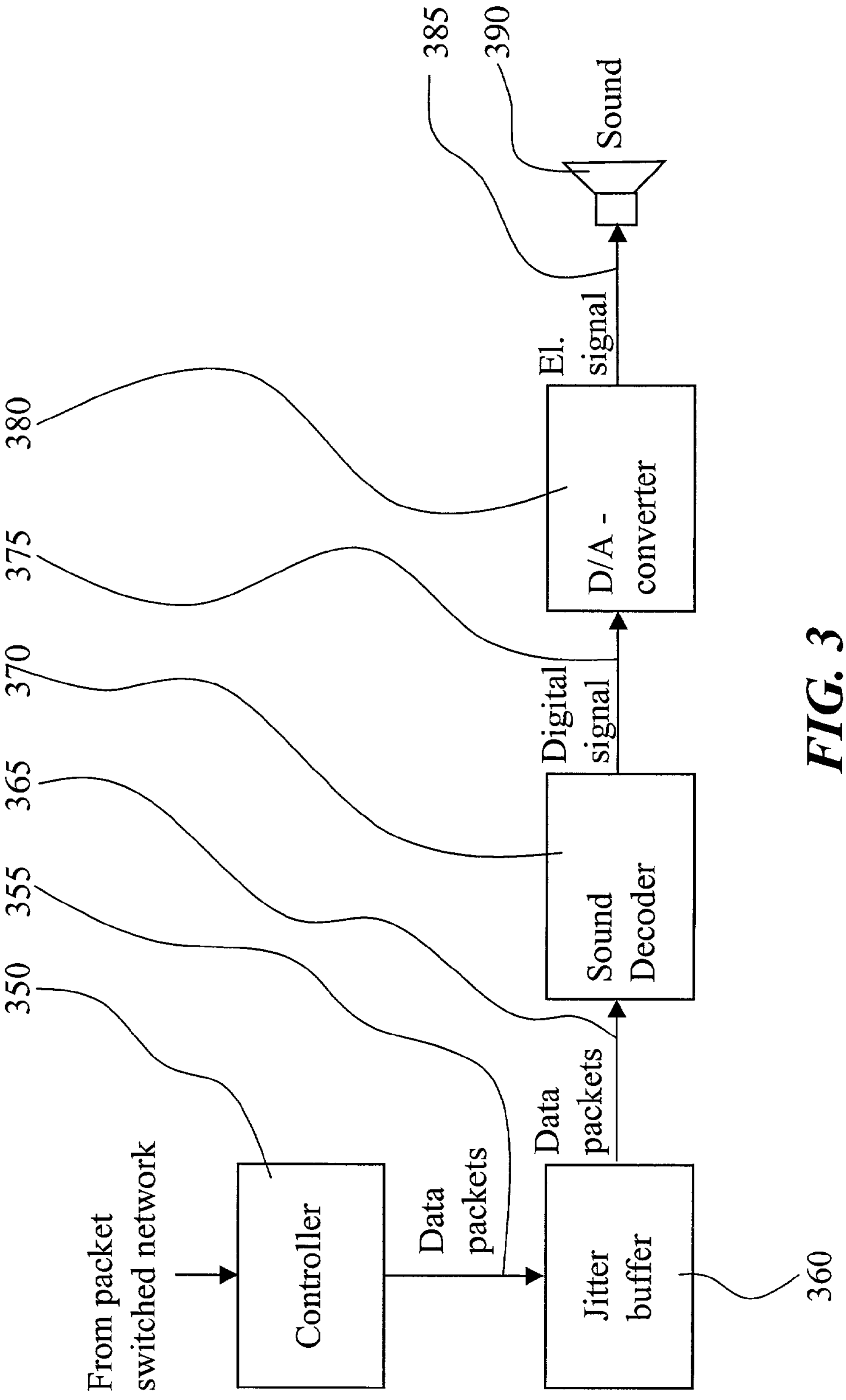
FIG. 3 shows an overview of the receiving part of a system for transmission of sound over a packet switched network.

In FIG. 3 a block diagram of the receiving part of a system for transmission of sound over a packet switched network is shown. A Controller 350 receives data packets from the packet switched network, strips addressing information and places the data packets 355 in a Jitter buffer 360. The Jitter buffer 360 is a storage medium, typically RAM, which regulates the rate by which data packets 365 exit the Jitter buffer 360. The physical capacity of the jitter buffer is such that incoming data packets 355 can be stored. Data packets 365 which exit the Jitter buffer 360 are inputted to a Sound Decoder 370. The Sound Decoder 370 decodes the information in the data packets into reproduced samples of a digital sound signal. The digital signal 375 is then converted by a D/A-converter 380 into an analog electric signal 385, which analog signal drives a sound reproducing system 390, for example, a loudspeaker that produces sound at the receiver end.

The design and operation of the Sound Encoder 230 and the Sound Decoder 370, in accordance with an embodiment of the invention, will now be described in greater detail with reference to FIGS. 4*a* and 4*b*. Apart from what is being described below with respect to the sound encoding/decoding blocks, the overall operation correspond to that previously described with reference to FIGS. 2 and 3.

Figure 4A:
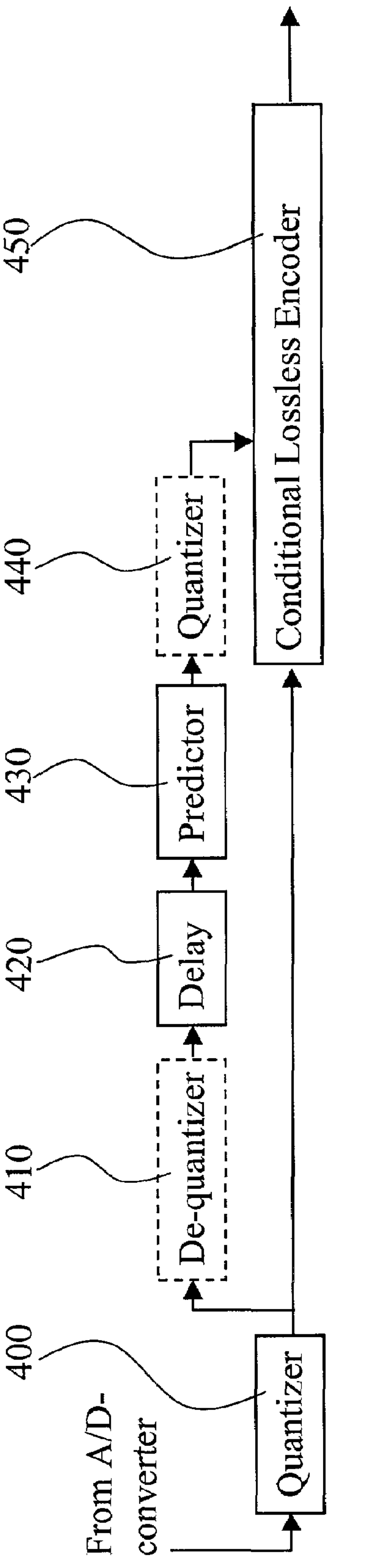
FIGS. 4*a* and 4*b* show overviews of a Sound Encoder at the transmitting part and of a Sound Decoder at the receiving part, respectively, of a system for transmission of sound over a packet switched network in accordance with an embodiment of the present invention.

In FIG. 4*a,* a Sound Encoder for encoding a digital signal at a transmitting end in accordance with an embodiment of the invention is shown. The Sound Encoder includes a first Quantizer 400, a De-quantizer 410, a Delay block 420, a Predictor 430, a second Quantizer 440 and a Conditional Lossless Encoder 450. The De-quantizer 410 and the second Quantizer 440 are depicted with dashed lines since they are not necessary elements of this embodiment. The use of these optional elements will be described later in an alternative embodiment.

Figure 4B:
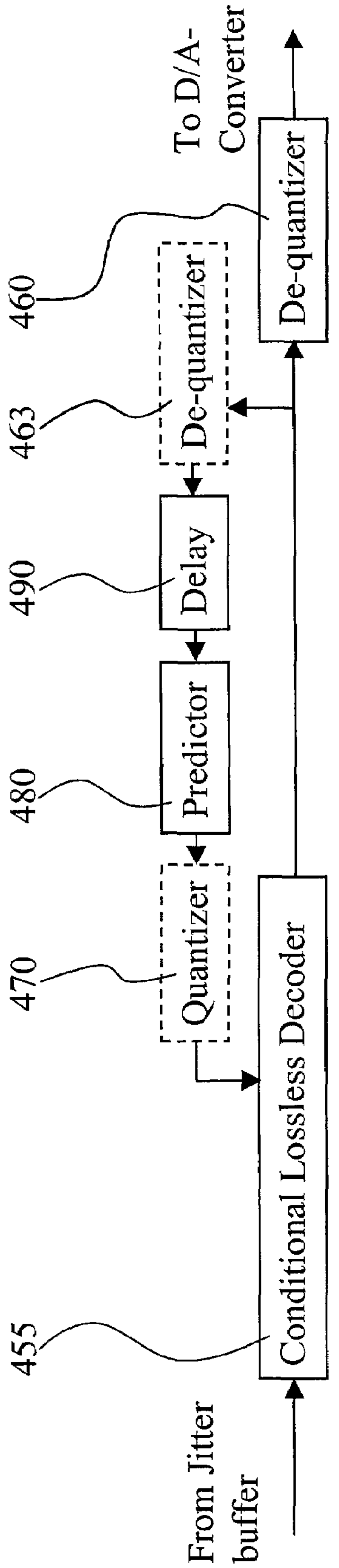

Correspondingly, in FIG. 4*b,* a Sound Decoder for decoding a digital signal at a receiving end in accordance with an embodiment of the invention is shown. The Sound Decoder includes a Conditional Lossless Decoder 455, a Quantizer 470, a Predictor 480, a Delay block 490 and De-quantizers 460 and 463. The Quantizer 470 and the De-quantizer 463 are depicted with dashed lines since they are not necessary elements of this embodiment. The use of these optional elements will be described later in an alternative embodiment.

The purpose of performing lossless encoding/decoding by means of the Conditional Lossless Encoder 450 and the Conditional Lossless Decoder 455 is to find a less bit-consuming way to describe the data that is transmitted from the transmitting end to the receiving end without loosing any information. Lossless encoding uses statistical information about the input signal to reduce the average bit rate. This is, for example, performed in such way that the code words are ordered in a table after how often they occur in the input signal. The most common code words are then represented with fewer bits than the rest of the code words. An example of a Lossless Encoder known in the art that uses this idea is the Huffman coder.

Lossless encoding only works well in networks without bit errors in the received data. The code words used in connection with lossless encoding are of different length, and if a bit error occurs it is not possible to know when a code word ends and a new begin. Thus, a single bit error does not only introduce an error in the decoding of the current code word, but in the whole block of data. When the packet switched network is an IP (Internet Protocol)-network, all damaged data packets are automatically discarded. Thus, in such a packet switched network there will be no bit errors in data packets received at the receiver end. Therefore, lossless encoding, such as scalar or block Huffman coding, are according to the invention suitable for use for independent compression of each of the coded blocks of digital samples which blocks together constitutes the digital signal.

The Conditional Lossless Encoder 450 and the Conditional Lossless Decoder 455 of the embodiment of FIGS. 4*a* and 4*b* both includes tables which are created to include all possible code words and their bit representation. Table look-ups are performed to losslessly encode a block of digital samples quantized by the Quantizer 400 before being transmitted as code words over the packet network. Correspondingly, at the receiver end, the code words of an encoded block of quantized digital samples are losslessly decoded to quantized digital samples which then are de-quantized by De-quantizer 460 to a reconstructed original block of digital samples.

In FIG. 4*a* digital samples of a digital signal received from the A/D-converter are quantized by quantizer 400 into quantized digital samples. For each quantized digital sample a prediction sample is generated by Predictor 430 based on one or more previously quantized digital samples. The predictor 430 generates for the prediction sample, possibly a quantization index thereof, based on the quantization levels, i.e. quantization indices or quantization values, for these previous, quantized digital samples, which levels have been outputted by the Quantizer 400 and delayed by the Delay block 420. The prediction sample, or its quantization index, is used for selecting one out of several look-up tables with code words within the Conditional Lossless Encoder 450. The quantized level, such as the index, of the current quantized digital sample from Quantizer 400 is used to select a specific entry of the selected look-up table. The Conditional Lossless Encoder will then output a code word corresponding to this specific entry of the selected table.

The code words of a complete encoded block of quantized digital samples are eventually assembled to a separate packet which is transferred to a Controller. Alternatively, each code word of an encoded block is collected by the Controller and then assembled to a separate packet for the encoded block. The Controller adds header information before transmitting the data packet over a packet switched network.

In FIG. 4*b* the Sound Decoder corresponding to the embodiment of FIG. 4*a* is shown. Packets with code words, or code words of disassembled packets, are received from a Jitter buffer by the Conditional Lossless Decoder 455. For each quantized digital sample a prediction sample is generated by Predictor 480 based on one or more previous, quantized digital samples. Predictor 480 at the receiving end is configured to operate in the same way as Predictor 430 at the transmitting end. The configuration of these predictors is typically such that the predictor state is zero, or close to zero, when generating prediction samples corresponding to the initial quantized digital samples of a digital signal. In the same way as at the transmitting end, predictor 480 may generate a quantization index of a predictor sample based on the quantization levels, i.e. quantization indices or quantization values, of previous, quantized digital samples, which levels implicitly have been outputted by the Lossless Decoder 455 and delayed by the Delay block 490. The generated prediction sample at the receiving end is used for selecting a look-up table, out of several tables, within the Conditional Lossless Decoder 455. A code word received from the Jitter buffer is used to address a specific entry of the selected table, after which a corresponding quantized digital sample is outputted for de-quantization by a De-quantizer 560, after which the digital sample is transferred to a D/A-converter.

In alternative embodiments, the Sound Encoder includes the De-quantizer 410 and/or the second Quantizer 440 as depicted in FIG. 4*a*. Correspondingly, the Sound Decoder in accordance with these alternative embodiments includes the Quantizer 470 and/or the De-quantizer 463.

Using De-quantizers 410 and 463 quantization values of quantized digital samples will be inputted to the Predictor 430 and 480 rather than quantization indices and the Predictors will generate prediction samples based on values rather than indices.

If the Predictors 430 and 480 do not include quantization tables for outputting quantization levels, such as indices, of the generated prediction samples, should that be desired, the Sound Encoder/Decoder will include Quantizers 440, 470 for providing quantization levels, e.g. indices, of the generated prediction samples. Thus, using the Quantizers 440 and 470 it may be ascertained that the quantization levels of the generated prediction samples will be valid levels belonging to a predefined set of levels, and not levels falling between different valid quantization levels.

According to the invention, in order to avoid error propagation, a generated prediction sample corresponding to a digital sample of one block of digital samples should not be based on digital samples of a previous block. In accordance with an embodiment, this is achieved by setting a predictor state of Predictor 430 to zero before a new block with quantized digital samples is encoded. Correspondingly, in the Sound Decoder at the receiving end, the predictor state of Predictor 480 is set to zero before decoding a new block with quantized digital samples. As an alternative to setting the predictor state to zero, state information can be included in each block of digital samples, or, the encoding/decoding can follow a scheme which uses no or little state information when encoding/decoding the beginning of a block.

Thus, the Sound Encoder/Decoder of the present invention is designed to reduce the bit rate needed when transmitting a digital signal over a packet switched network. In this embodiment, the block of digital samples on which the Sound Encoder/Decoder operates on are sound segments with digitized sound samples.

The present invention is not optimized for any specific kind of predictor. However, for sound signals one choice of predictor is the one obtained by LPC analysis of the quantized signal, eventually refined with a long-term predictor as is well known for a person skilled in the art. Also non-linear predictors, such as the one defined by the oscillator model disclosed in "Time-Scale Modification of Speech Based on a Non-linear Oscillator Model", G. Kubin and W. B. Kleijn, in Proc. Int. Conf. Acoust. Speech Sign. Process, (Adelaide), pp. I453–I456, 1994, can be used in the encoding/decoding scheme of the present invention.

Figure 5A:
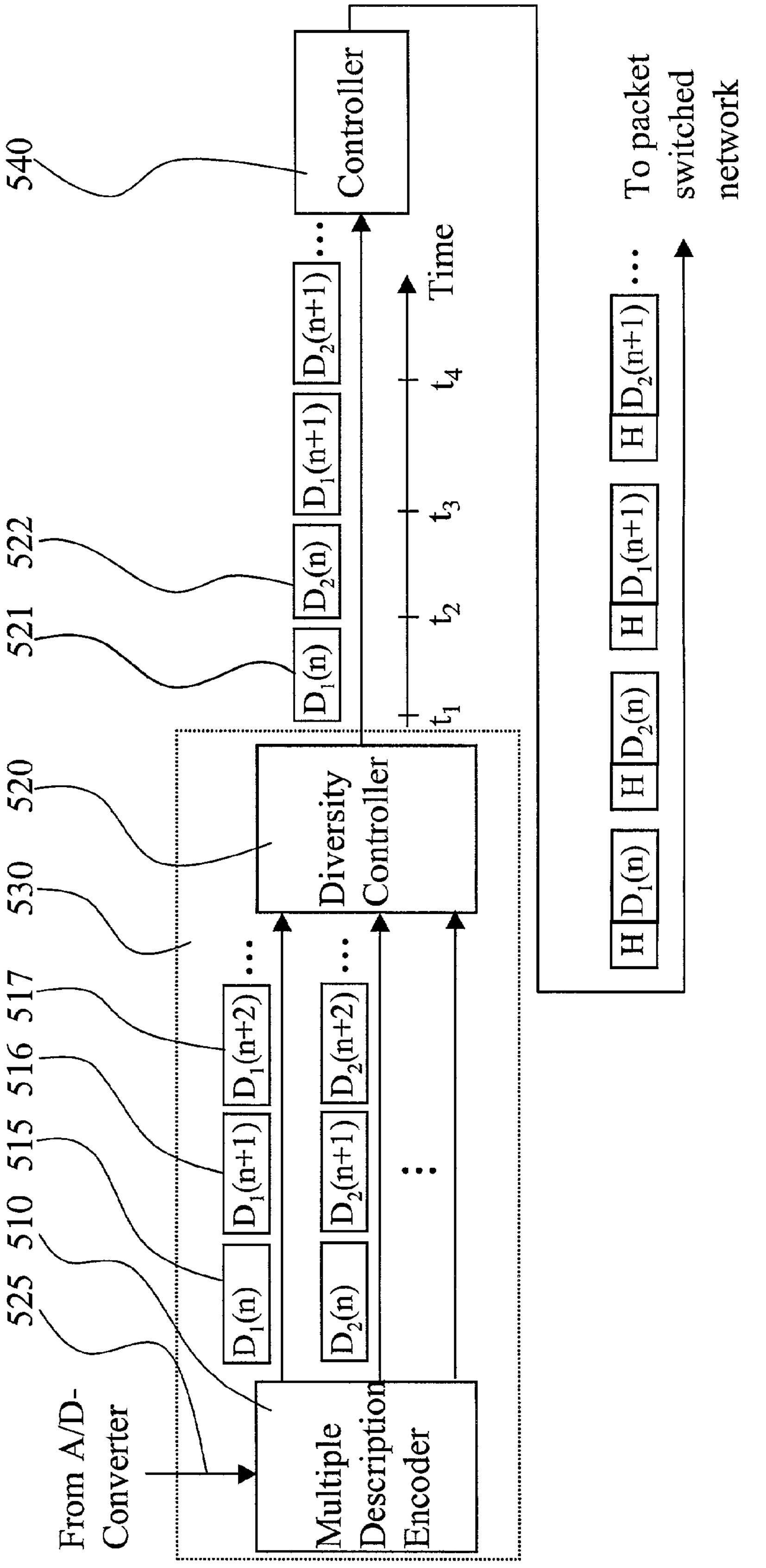
FIGS. 5*a* and 5*b* show overviews of a Sound Encoder at the transmitting part and of a Sound Decoder at the receiving part, respectively, of a system for transmission of sound over a packet switched network in accordance with yet another embodiment of the present invention.
Figure 5B:
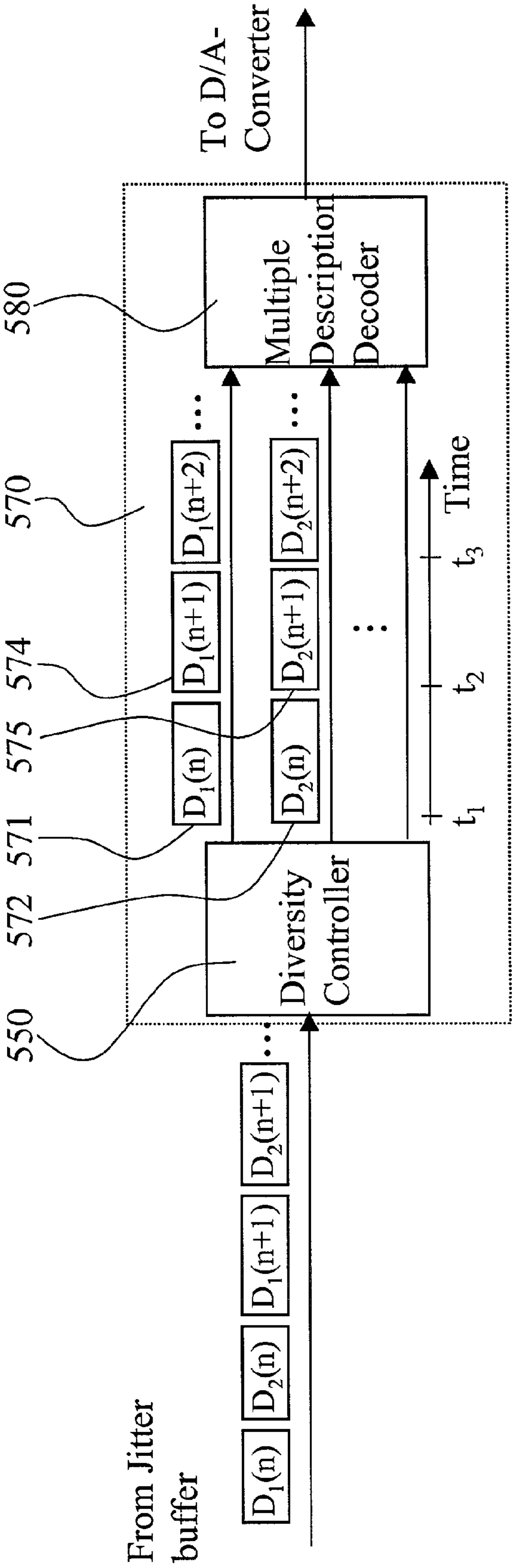

According to the invention the Sound Encoder/Decoder is further designed to increase the robustness against packet losses and delays in the packet switched network. This design to increase the robustness relies on representing the sound signal, or any digital signal in the general case, with multiple descriptions. This design is illustrated in FIGS. 5*a* and 5*b* in accordance with an embodiment of the invention. Apart from what is being described below with respect to the sound encoding/decoding blocks, the overall operation correspond to that previously described with reference to FIGS. 2 and 3.

In FIG. 5*a,* the Sound Encoder 530 at the transmitting end includes a Multiple Description Encoder 510 and a Diversity Controller 520. Correspondingly, the Sound Decoder 570 of FIG. 5*b* at the receiving end includes a Diversity Controller 550 and a Multiple Description Decoder 580.

Turning now to FIG. 5*a,* the Multiple Description Encoder 510 of the Sound Encoder 530 encodes a sampled sound signal 525 in two different ways, thereby obtaining two different bitstream representations, i.e. two different descriptions, of the sound signal. As previously described, each description has its own set of quantization levels, achieved, for example, by shifting the quantization levels of one description with half a quantization step. Correspondingly, if three descriptions were to be provided, the quantization levels of the second description would be shifted with a third step with respect to the first description, and the third description with a third step with respect to the second description. Thus, as indicated in FIG. 5*a,* the sound signal may be encoded using more than two descriptions without departing from the scope of the present invention. However, for ease of description, only two signal descriptions will be used in the herein disclosed embodiments of the invention.

Each description provides a segment description of an encoded sound signal segment of the sound signal. The Multiple Description Encoder 510 generates each description and its segment descriptions by conditional lossless encoding of the digitized sound samples in accordance with what has previously been described with reference to FIG. 4*a.* Thus, a respective set of all the elements shown in FIG. 4*a* will be present in a Multiple Description Encoder 410 referred to by FIG. 5*a* for each generated description. Correspondingly, a respective set of all the elements shown in FIG. 4*b* will be present for each description used in a Multiple Description Decoder referred to by FIG. 4*b.*

In FIG. 5*a,* the different segment descriptions of the same sound segment are transferred in respective packets to the Diversity Controller 520. In FIG. 5*a,* two descriptions have been indicated, $D_1$ and $D_2$. The consecutive segments n, n+1, n+2, and so on, are represented by description $D_1$ as segment descriptions $D_1(n)$, $D_1(n+1)$, $D_1(n+2)$ . . . , which segment descriptions are transferred in respective consecutive data packets 515, 516, 517 from the Multiple Description Encoder 510 to the Diversity Controller 520. Correspondingly, the same segments are also represented as segment descriptions $D_2(n)$, $D_2(n+1)$, $D_2(n+2)$ . . . by description $D_2$ and are also transferred in respective data packets to the Diversity Controller. Thus, each sound segment of the sound signal 625 is represented by one segment description of each description, for example, in FIG. 5*a* sound segment n+1 is represented by segment description $D_1(n+1)$ of description $D_1$ and by segment description $D_2(n+1)$ of description $D_2$.

The Diversity Controller 520 dispatches the packets received from the Multiple Description Encoder 510 in accordance with the diversity scheme used. In FIG. 5*a* the Diversity Controller 520 sequences each segment description of one sound segment in separate packets. The packets containing different segment descriptions of the same sound segment are transferred to the Controller 540 at different time instances. For example, as indicated in FIG. 5*a,* the two segment descriptions $D_1(n)$ and $D_2(n)$ of sound segment n is delivered to the Controller 540 in separate packets 521 and 522 at different points of time $t_1$ and $t_2$. Thus, a delay of $t_2-t_1$ is introduced to create time diversity. A typical delay $t_2-t_1$ that could be used, in connection with typical sound segment lengths of 20 ms, is 10 ms. Upon reception of a packet from the Diversity Controller 520, the Controller 540 formats the packet, such as adding sequencing and destination address information, for immediate transmission on the packet switched network. Thus, the Controller 540 adds a header, H, with information to each packet. In the case of IPv4 transport using UDP (User Datagram Protocol) and RTP (Real Time Protocol), the header size is 320 bits. For a typical speech segment length of 20 ms, this leads to 320 bits per 20 ms, i.e. to 16 kbit/s for the headers of each description used. If each speech segment is represented by two segment descriptions, the headers of the packets transferring the segment descriptions will together require a bit rate of 2*16=32 kbit/s. This can be compared to the bit rate of 64 kbit/s for standard PCM (Pulse Code Modulated) telephony. Consequently, the overhead bit rate will be 50% (32 divided with 64) of the payload rate.

As previously described with reference to FIG. 3, packets are received at the receiver end by a Controller 350. The Controller removes header information and transfers the packets to the Jitter buffer 360, which in turn transfers the packets to the Sound Decoder 370. Turning now to FIG. 5*b,* the Diversity Controller 550 of the Sound Decoder 570 receives the packets with the different segment descriptions from a jitter buffer. The Diversity Controller then schedules the different segment descriptions of the same sound segment for transfer to the Multiple Description Decoder 580 at the same time. Thus, as illustrated in the FIG. 5*b,* the Multiple Description Decoder 580 will, for example, receive both packets 571 and 572 with respective segment descriptions $D_1(n)$ and $D_2(n)$ of sound segment n at the same time, and then both packets 574 and 575 with respective segment descriptions $D_1(n+1)$ and $D_2(n+1)$ of sound segment n+1, and so on. The Multiple Description Decoder 580 will for each sound segment extract the joint information from the different packets and decode the sound signal segment for transfer to a D/A-converter. If, for example, segment description $D_1(n)$ did not arrive at the receiver end, or arrived too late, the Diversity Controller 550 will only schedule $D_2(n)$ (if two descriptions are used) to the Multiple Description Decoder 580, which then will decode sound segment n of the sound signal with adequate quality from the single segment description $D_2(n)$ received.

Figure 6:
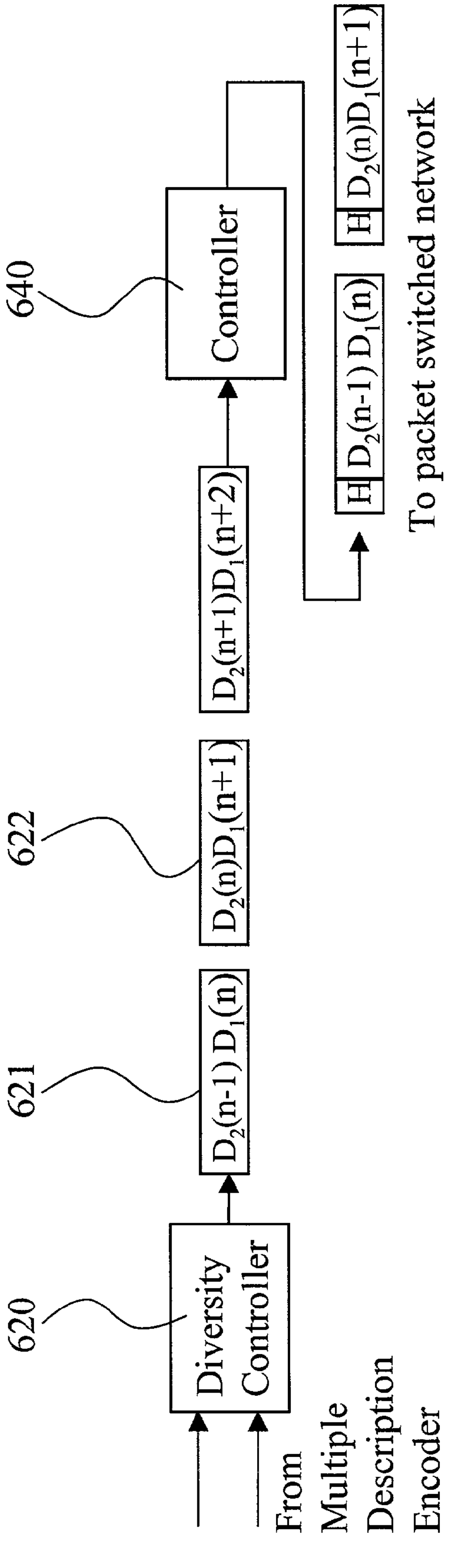
FIG. 6 shows some of the element of the transmitting part of a system for transmission of sound over a packet switched network in accordance with a further embodiment of the present invention.

In FIG. 6 another embodiment of the present invention is shown. This embodiment differs from the one previously described with reference to FIGS. 5*a* and 5*b* with respect to the organization of segment descriptions in the packets transmitted by the packet switched network. Thus, the difference lies in the packet assembling/disassembling performed at the transmitting/receiving end by the Diversity Controller of the Sound Encoder/Decoder. This difference will now be described below.

As described with reference to FIGS. 5*a* and 5*b,* the overhead resulting from the headers of the different packets transferring different segment descriptions of the same sound segment is quite extensive. To alleviate this, segment descriptions of different descriptions and relating to different sound segments are grouped together in the same packet before transmission of the packet over the packet switched network. As shown in FIG. 6 the Diversity Controller 620 of the Sound Encoder at the transmitting end groups two individual segment descriptions of two consecutive sound segments together in each packet. The two segment descriptions of a packet belong to respective descriptions of the sound signal. For example, one packet will contain segment description $D_2(n-1)$ of sound segment n−1 and segment description $D_1(n)$ of sound segment n. The Controller 640 will as previously described add header information to each packet before transmitting the packet including the two segment descriptions over the packet switched network.

Thus, just as in the embodiment of FIG. 5, the Diversity Controller 620 of this embodiment will sequence each segment description of a sound segment in separate packets, and, as in the embodiment of FIG. 5, the packets containing different segment descriptions of the same sound segment will be transferred to the Controller 640 at different time instances. In FIG. 6, the two segment descriptions $D_2(n)$ and $D_1(n+1)$ of sound segment n and n+1 are delivered to the Controller 640 in packet 622. Thus, segment n+1 must have been encoded before segment description $D_2(n)$ can be transferred to the controller. Segment description $D_1(n)$ on the other hand was transferred in a previous packet 621 to the controller. If a sound segment is 20 ms, the transfer of $D_2(n)$ must be delayed with 20 ms compared with the transfer of $D_1(n)$ since $D_2(n)$ is to be scheduled in the same packet 622 as $D_1(n+1)$. Thus, this scheme will automatically provide time diversity since different segment descriptions of the same sound segment will be transferred to the Controller 640 with a 20 ms interval (given a sound segment length of 20 ms). Thus, in comparison with the embodiment of FIG. 5, an additional delay between the two segment descriptions of the same sound segment is automatically introduced with this scheme of assembling packets with several segment descriptions. This additional delay between segment descriptions provides an additional time diversity advantage and can be compensated for later in the transmission chain, for example, by having lower delay settings in the jitter buffer at the receiving end.

Moreover, the amount of payload data in one packet according to this embodiment corresponds to the total amount of data generated from one sound segment, therefore, the overhead information is not increased when creating time diversity with this scheme.

In correspondence with what has been described above, the Diversity Controller at the receiver end in this embodiment will divide the received packets in their segment description parts before transferring the segment descriptions to the Multiple Description Decoder, in correspondence with what has been shown in FIG. 5*b.*

The effect of the time diversity scheme referred to by FIG. 6 is again that if one packet is lost or delayed during transmission over the packet switched network, descriptions of all sound segments will still be available at the receiver end and no sound segment loss will be perceived.

According to an embodiment of the invention the Sound Encoder/Decoder 230, 370 encodes/decodes PCM indices of a standard 64 kbit/s PCM bitstream. This embodiment is for ease of description described by again referring to FIGS. 4*a*, 4*b,* 7*a* and 7*b.* As previously described the elements in respective FIGS. 4*a* and 4*b* are present for each description generated/decoded by the Sound Encoder/Decoder 230, 370. However, the Quantizer 400 of FIG. 4*a* and De-quantizer 460 of FIG. 4*b* are exchanged with a respective Transcoder 715 to be described below. Furthermore, in case the digital signal is not already a PCM encoded signal, the Sound Encoder 230 includes a PCM Encoder 710 prior to its Transcoder 715 and the Sound Decoder 370 includes a PCM Decoder 760 after its Transcoder 755. In this embodiment, the Sound Encoder 230 again includes a Multiple Description Encoder 705 feeding a Diversity Controller 740 with multiple descriptions of one and the same sound segment. Correspondingly, the Sound Decoder 370 includes a Multiple Description Decoder 765 receiving multiple descriptions of one and the same sound segment from a Diversity Controller 750 at the receiving end.

The Multiple Description Encoder 705 of the Sound Encoder 230 includes an ordinary PCM Encoder 710 followed by a Transcoder 715. Thus, the digital signal received by the Sound Encoder 230 from the A/D converter is encoded using an ordinary PCM Encoder 710. The obtained PCM bitstream is then transcoded, i.e. translated, into several bitstreams by the Transcoder 715, after which each bitstream gives a coarse representation of the PCM signal. The corresponding Multiple Description Decoder 765 at the receiving end includes a Transcoder 755 for transcoding received multiple bitstream descriptions to a single PCM bitstream. This PCM bitstream is then decoded by an ordinary PCM Decoder 760 before being transferred to a D/A-converter. The method of transcoding, or translating is exemplified below where one 64 kbit/s PCM bitstream is transcoded into two bitstreams which provide multiple descriptions of the PCM signal.

A standard 64 kbit/s PCM Encoder 710 using $\mu$-law log compression encodes the samples using 8 bits/sample. This gives 256 different code words, but the quantizer only consists of 255 different levels. The zero-level is represented by two different code words to simplify the implementation in hardware. According to the embodiment, each quantization level is represented by an integer index, starting with zero for the most negative level and up to 254 for the highest level. The first of the two bitstreams is achieved by removing the least significant bit of each of the integer indices. This new index represents a quantization level in the first of the two coarse quantizers. The second bitstream is achieved by adding one to each index before removing the least significant bit. Thus, two 7-bit representations are achieved from the original 8-bit PCM representation. Decoding of the two representations can either be performed on each individual representation, in case of packet loss, or on the two representations in which case the original PCM signal is reconstructed. The decoding is simply a transcoding back into the PCM indices, followed by table look-up.

Alternatively, the PCM Encoder 710 is a standard 64 kbit/s PCM Encoder using A-law log compression. In this case the number of levels in the quantizer is 256, which is one more than in a $\mu$-law coder. To represent these 256 levels using two new quantization grids, and be able to fully reconstruct the signal, one grid with 128 levels and one with 129 levels is needed. It would be desired to use two 7-bit grids like in the $\mu$-law case, however the problem with the extra quantization level has to be solved. According to the invention each quantization level is represented by an integer index, starting with zero for the most negative level and up to 255 for the highest level. The exact same rule as in the $\mu$-law case is used to form the new indices, except when representing index number 255. The index number 255 is represented with index number 126 for the first quantizer and index number 127 for the second instead of 128 and 127, which would be obtained if the rule would be followed. The decoder has to check this index representation when transcoding the two bitstreams into the A-law PCM bitstream. If only the first of the two descriptions is received after transmission, and the 255th index was encoded, the decoder will introduce a quantization error that is a little higher than for the other indices.

An encoded PCM signal includes a high degree of redundancy. Therefore, it is particularly advantageous to combine the use of PCM signals with lossless encoding/decoding of the multiple descriptions derived from a PCM signal.

If the digital signal received by the Sound Encoder 230 already is represented as a 64 kbit/s PCM bitstream, and if the Sound Decoder 370 at the receiving part should output a 64 kbit/s PCM bitstream, the PCM Encoder 710 at the transmitting part and the PCM Decoder 760 at the receiving part will not be needed. In this case the Multiple Description Encoder 705 of the present invention receives the PCM bitstream and converts the PCM indices to the 0 to 254 representation described above. This representation is fed directly to the Transcoder 715, which transcodes the bitstream into two new bitstreams using the simple rules given above. At the receiver end of the system the information in the received packets are collected by the Diversity Controller 750. If all packets arrive the Transcoder 755 merges and translates the information from the multiple descriptions back into the original PCM bitstream. If some packets are lost the original bitstream cannot be exactly reconstructed, but a good approximation is obtained from the descriptions that did arrive.

Figure 7A:
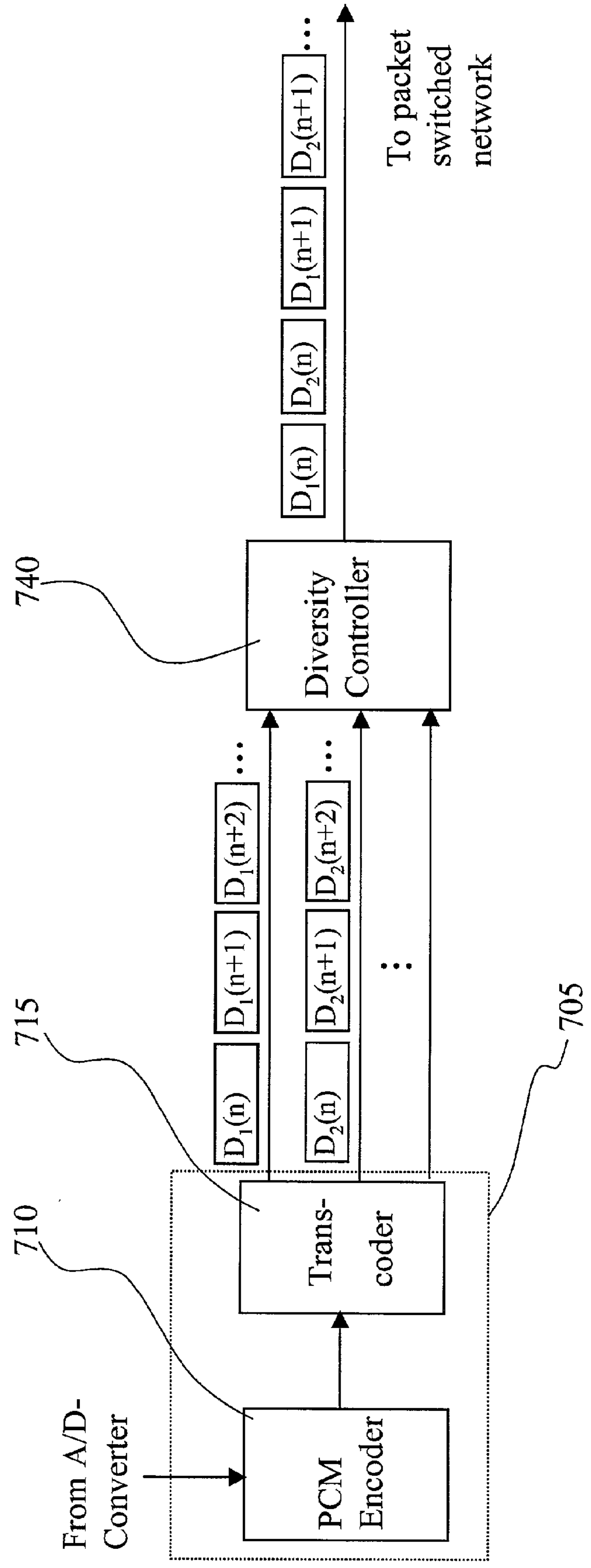
FIGS. 7*a* and 7*b* show overviews of a Sound Encoder at the transmitting part and of a Sound Decoder at the receiving part, respectively, of a system for transmission of sound over a packet switched network in accordance with yet another embodiment of the present invention.
Figure 7B:
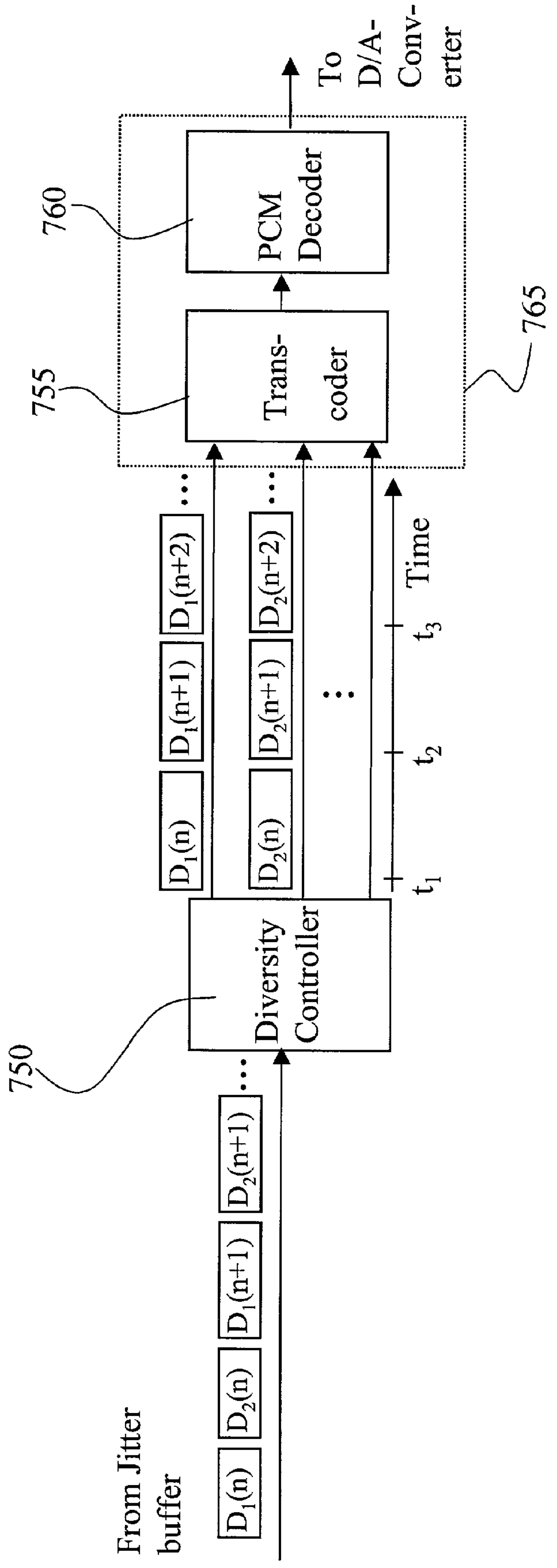
Figure 8A:
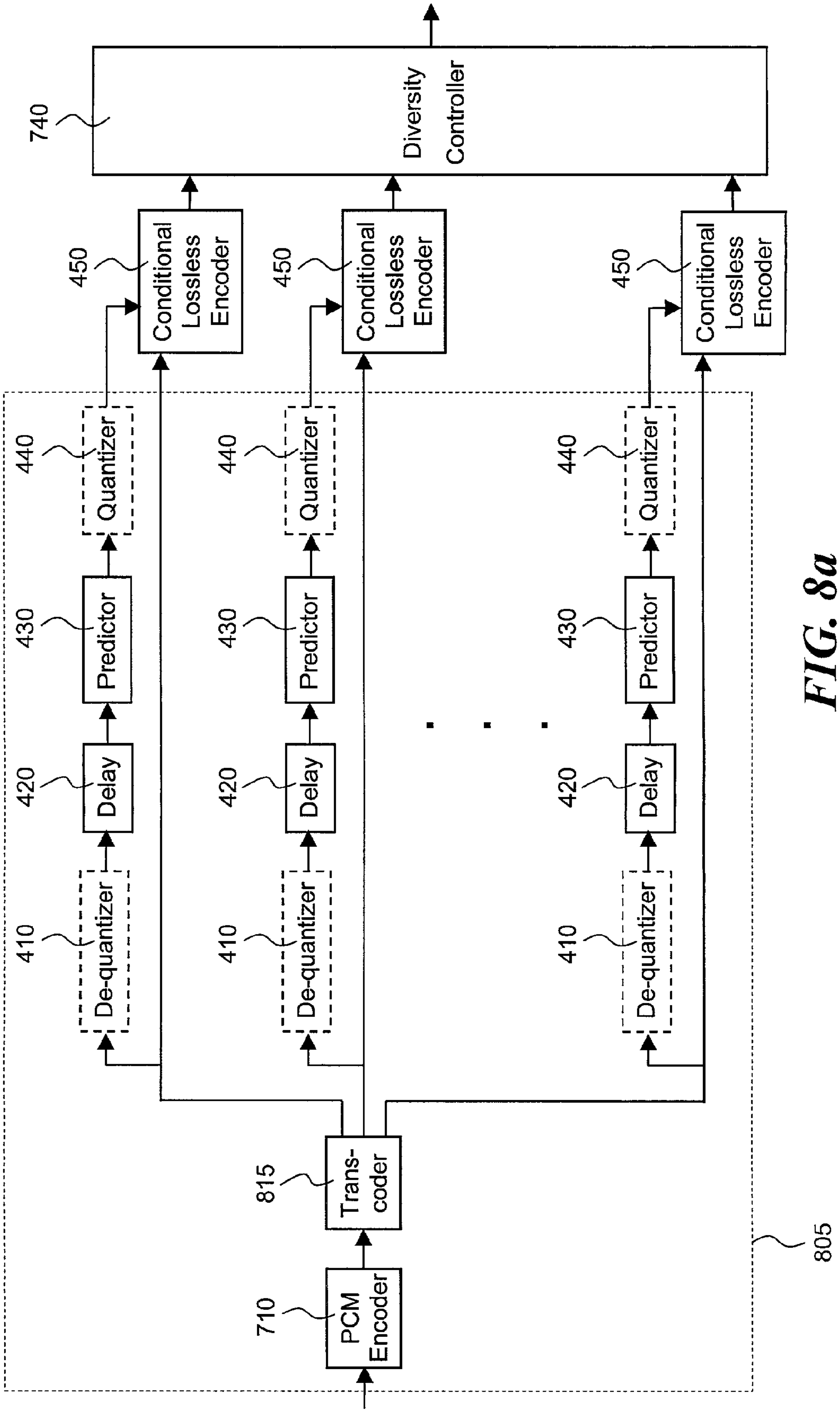
FIGS. 8*a* and 8*b* show overviews of a Sound Encoder at the transmitting part and of a Sound Decoder at the receiving part, respectively, of a system for transmission of sound over a packet switched network in accordance with yet another embodiment of the present invention.
Figure 8B:
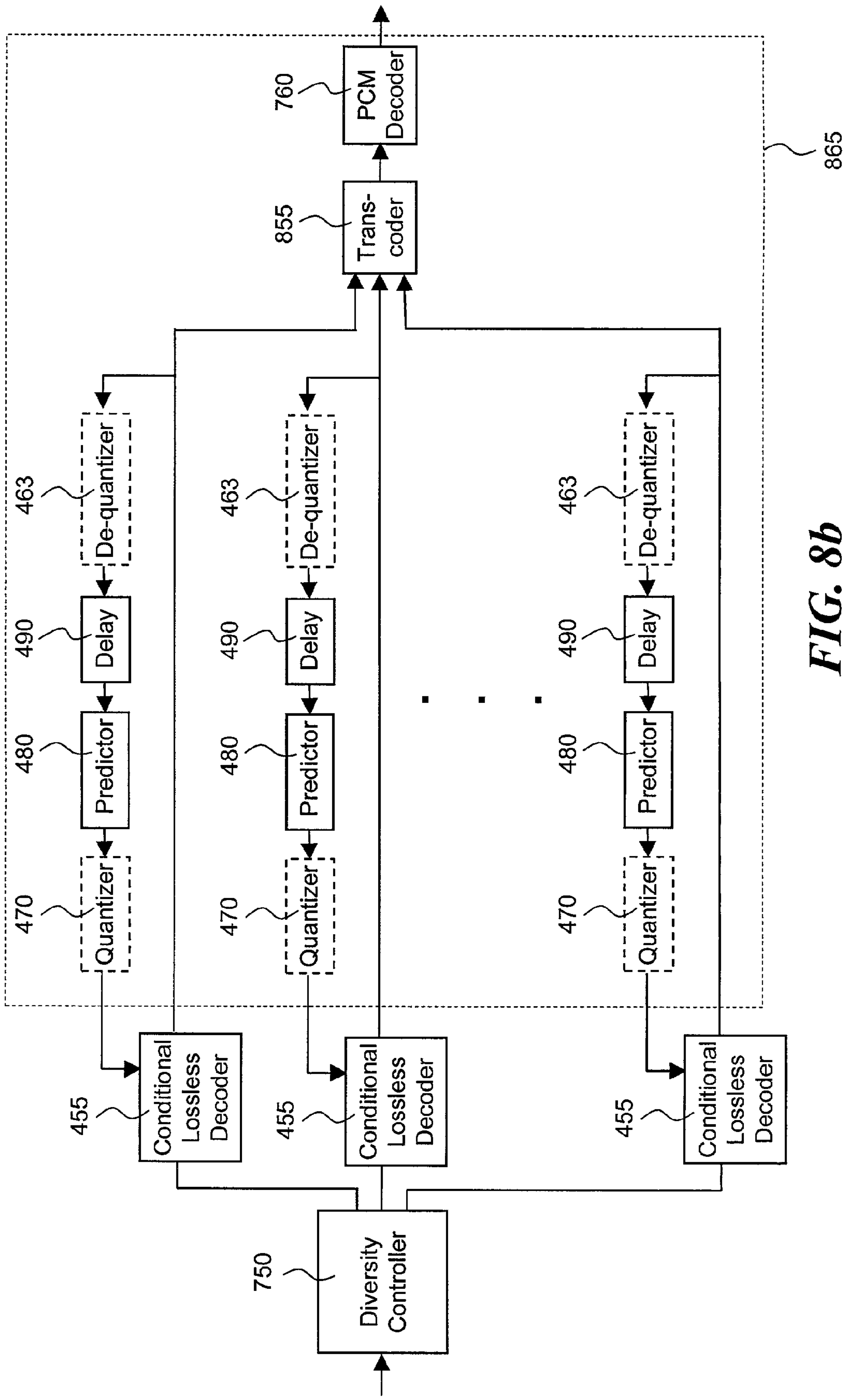

Referring next to FIGS. 8*a* and 8*b*, other embodiments of the Sound Encoder/Decoder 230, 370 are shown. In FIG. 8*a*, the de-quantizer 410, delay 420, predictor 430, and quantizer 440 are separated from a transcoder 815. All these blocks are combined with that transcoder block 715 in the embodiment of FIG. 7*a*. In FIG. 8*b*, the quantizer 470, predictor 480, delay 490, and de-quantizer 463 are separate from a transcoder 855 in contrast to the embodiment of FIG. 7*b* that combines these functions in that transcoder block 755.

Although the invention has been described above by way of example with reference to different embodiments thereof, it will be appreciated that various modifications and changes can be made without departing from the scope of the invention as defined in the appended claims.

What is claimed is:

1. A method of encoding a digital signal and the digital signal's blocks of digital samples for transmission over a packet switched network, the method including steps of:

quantizing binary representations of the digital samples to more coarsely representations of the digital samples to create quantized digital samples;

generating prediction samples as fixed point or floating point representations based on previous, quantized digital samples of said quantizing step; and lossless encoding the quantized digital samples through selection from a set of binary representations, the set being optimized for said prediction samples.

2. The method of encoding the digital signal and its blocks of digital samples for transmission over the packet switched network as recited in claim 1, wherein the lossless encoding of the quantized digital samples is based on table look-ups.

3. The method of encoding the digital signal and its blocks of digital samples for transmission over the packet switched network as recited in claim 2, wherein table look-ups are performed with a quantized digital sample for generating two quantization region boundary levels corresponding to the quantized digital sample, wherein the levels with the common generated prediction value and another table are mapped onto a pair of likelihood values tat are used for lossless encoding the quantized digital sample.

4. The method of encoding the digital signal and its blocks of digital samples for transmission over the packet switched network as recited in claim 1, wherein said lossless encoding step for a specific quantized digital sample comprises outputting a specific code ward which corresponds to a specific entry of a table with code words, said specific entry being derived with the generated prediction sample corresponding to said specific quantized digital sample.

5. The method of encoding the digital signal and its blocks of digital samples for transmission over the packet switched network as recited in claim 4, wherein:

said table with code wait is chosen among several tables with code words based upon said generated prediction sample, and said specific entry is derived as the entry corresponding to said quantization index of said quantized digital sample.

6. The method of encoding the digital signal and its blocks of digital samples for transmission over the packet switched network as recited in claim 1, wherein said step of generating prediction samples is preceded by de-quantization of the quantized digital samples, thereby obtaining the quantization values of said quantized digital samples.

7. The method of encoding the digital signal and its blocks of digital samples for transmission over the packet switched network as recited in claim 1, further comprising a step of quantizing the generated prediction samples, wherein said lossless encoding step is based on generated prediction samples having quantization levels of a predefined set of quantization levels.

8. The method of encoding the digital signal and its blocks of digital samples for transmission over the packet switched network as recited in claim 1, further comprising a step of setting a state of a predictor generating said prediction samples to zero before starting to encode one of said blocks with digital samples.

9. The method of encoding the digital signal and its blocks of digital samples for transmission over the packet switched network as recited in claim 8, wherein said lossless encoding step is conditioned on the quantization indices of said generated prediction samples.

10. The method of encoding the digital signal and its blocks of digital samples for transmission over the packet switched network as recited in claim 1, wherein said encoding is performed by a multiple description encoder, which multiple description encoder encodes each block of said blocks of digital samples with multiple block descriptions by performing the steps of the encoding method individually for each generated block description.

11. The method of encoding the digital signal and its blocks of digital samples for transmission over the packet switched network as recited in claim 10, further comprising a step of transmitting, for each block of said blocks of digital samples, at least two different block descriptions in respective data packets with a predefined time interval between the packets.

12. The method of encoding the digital signal and its blocks of digital samples for transmission over the packet switched network as recited in claim 11, further comprising a step of grouping a respective block description of at least two different blocks of digital samples together for transmission in one and the same data packet.

13. The method of encoding the digital signal and its blocks of digital samples for transmission over the packet switched network as recited in claim 10, wherein said digital signal is a digitized sound signal and said blocks of digital samples are sound segments, and wherein the encoding method in said multiple description encoder includes an initial step of transcoding an n-bit PCM represented digitized sound signal to at least two representations represented by fewer than n bits each and with respective sets of quantization levels for the segment descriptions of the sound segments of said digitized sound signal.

14. The method of encoding the digital signal and its blocks of digital samples for transmission over the packet switched network as recited in claim 1, wherein said digital signal is a digitized sound signal and said blocks of digital samples are sound segments.

15. A method of decoding a digital signal and the digital signal's blocks of digital samples received from a packet switched network, the method comprising steps of:

generating prediction samples as fixed point or floating point representations based on previous, quantized digital samples of said digital signal resulting from a lossless decoding of received code words;

lossless decoding the received code words to create quantized digital samples based on a set of binary representations, the set being optimized for said prediction samples; and de-quantizing the quantized digital samples resulting from the lossless decoding step into binary representations of the digital samples of said digital signal.

16. The method of decoding the digital signal and its blocks of digital samples received from the packet switched network as recited in claim 15, wherein the lossless decoding of the received code words are based on table look-ups.

17. The method of decoding the digital signal and its blocks of digital samples received from the packet switched network as recited in claim 16, wherein the received code words represents likelihood values, wherein two likelihood values with a generated prediction value and a table are mapped onto two quantization region boundary levels of a corresponding quantized digital sample, said levels being used to derive the corresponding quantized digital sample by performing table look-ups.

18. The method of decoding the digital signal and its blocks of digital samples received from the packet switched network as recited in claim 15, wherein said lossless decoding step for a specific quantized digital sample comprises a step of outputting a specific quantization level which corresponds to a specific entry of a table with quantization levels, said specific entry being selected with a received code word corresponding to said specific quantized digital sample.

19. The method of decoding the digital signal and its blocks of digital samples received from the packet switched network as recited in claim 18, wherein said table with quantization levels is chosen among several tables with quantization levels based upon a generated prediction sample corresponding to said specific quantized digital sample.

20. The method of decoding the digital signal and its blocks of digital samples received from the packet switched network as recited in claim 15, wherein said step of generating prediction samples is preceded by de-quantization of the quantized digital samples resulting from the lossless decoding step, thereby obtaining the quantization values of said quantized digital samples.

21. The method of decoding the digital signal and its blacks of digital samples received from the packet switched network as recited in claim 15, further comprising a step of quantizing the generated prediction samples, wherein said lossless decoding step is based on generated prediction samples having quantization levels of a predefined set of quantization levels

22. The method of decoding the digital signal and its blocks of digital samples received from the packet switched network as recited in claim 21, wherein said lossless decoding step is conditioned on the quantization indices of said generated prediction samples.

23. The method of decoding the digital signal and its blocks of digital samples received from the packet switched network as recited in claim 15, further comprising a step of setting a state of a predictor generating said prediction samples to zero before starting to decode one of said blocks with digital samples.

24. The method of decoding the digital signal and its blocks of digital samples received from the packet switched network as recited in claim 15, wherein said decoding is performed by a multiple description decoder, which multiple description decoder decodes each black of said blocks of digital samples based on at least two different received black descriptions by performing the steps of the decoding method preceding the de-quantizing step individually for each received block description.

25. The method of decoding the digital signal and its blocks of digital samples received from the packet switched network as recited in claim 15, comprising the steps of:

waiting a predefined time period for reception of at least two different packets including different block descriptions of one and the same block of digital samples;

performing the steps of the decoding method preceding the de-quantizing step with respect to those, one or several, different block descriptions of said block of digital samples received within said predefined time period; and de-quantizing the one, or a merger of the several, block descriptions.

26. The method of decoding the digital signal and its blocks of digital samples received from the packet switched network as recited in claim 25, wherein each received packet comprises several block descriptions of several different blocks of digital samples grouped together, the method comprising a step of dividing successively received packets with respect to the included block descriptions, thereby obtaining several different block descriptions for each block of digital samples to be decoded.

27. The method of decoding the digital signal and its blocks of digital samples received from the packet switched network as recited in claim 25, wherein said digital signal is a digitized sound signal and said blocks of digital samples are sound segments, and wherein said digitized sound signal is a PCM encoded bitstream, and wherein any merger of said de-quantizing step involves transcoding at least two segment representations, each represented by fewer than n bits, to a single n-bit PCM representation of said one and the same sound signal segment.

28. The method of decoding the digital signal and its blocks of digital samples received from the packet switched network as recited in claim 15, wherein said digital signal is a digitized sound signal and said blocks of digital samples are sound segments.

29. A computer readable medium having computer executable instructions for causing a digital signal and the digital signal's blocks of digital samples to be encoded for transmission over a packet switched network, the computer executable instructions performing steps of:

quantizing binary representations of the digital samples to more coarsely representations of the digital samples to create quantized digital samples;

generating prediction samples as fixed point or floating point representations based on previous, quantized digital samples of said quantizing step; and lossless encoding the quantized digital samples through selection from a set of binary representations, the set being optimized for said prediction samples.

30. A computer readable medium having computer executable instructions for causing a digital signal and the digital signal's blocks of digital samples received from a packet switched network to be decoded, the computer executable instructions performing steps of:

generating prediction samples as fixed point or floating point representations based on previous, quantized digital samples of said digital signal resulting from a lossless decoding of received code words;

lossless decoding the received code words to create quantized digital samples based on a set of binary representations, the set being optimized for said prediction samples; and de-quantizing the quantized digital samples resulting from the lossless decoding step into binary representations of the digital samples of said digital signal.

* * * * *

UNITED STATES PATENT AND TRADEMARK OFFICE

CERTIFICATE OF CORRECTION

PATENT NO. : 6,970,479 B2
DATED : November 29, 2005
INVENTOR(S) : Abrahamsson et al.

It is certified that error appears in the above-identified patent and that said Letters Patent is hereby corrected as shown below:

Column 16,
Line 34, “tat,” should read -- that --.
Line 40, “ward” should read -- word --.
Line 47, “wait” should read -- words --.

Column 18,
Line 31, “blacks” should read -- blocks --.
Lines 52 and 53, “black” should read -- block --.

Signed and Sealed this

Twenty-first Day of March, 2006

JON W. DUDAS
*Director of the United States Patent and Trademark Office*